United States Patent [19]

Besser

[11] Patent Number: 4,796,537
[45] Date of Patent: Jan. 10, 1989

[54] MOBILE TRUCK TURNTABLE

[76] Inventor: Robert G. Besser, 3115 Aloha La., Chico, Calif. 95926

[21] Appl. No.: 124,295

[22] Filed: Nov. 23, 1987

[51] Int. Cl.⁴ .............................................. B65G 67/04
[52] U.S. Cl. ........................................ 104/37; 104/44; 104/45; 104/46; 414/537
[58] Field of Search ............... 414/537, 303, 350, 351, 414/401; 104/35–37, 44–46

[56] References Cited

U.S. PATENT DOCUMENTS

| 1,358,748 | 11/1920 | Jones | 104/44 X |
| 1,449,767 | 3/1923 | Maclean | 104/45 X |
| 1,574,271 | 2/1926 | Wilcox | 104/45 |
| 1,797,830 | 3/1931 | Koehler | 104/44 |
| 2,544,113 | 3/1951 | Snead | 104/45 X |
| 2,572,776 | 10/1951 | Smith | 104/45 X |
| 3,185,109 | 5/1965 | Mengel | 104/45 |
| 3,233,767 | 2/1966 | Goodacre | 414/537 X |
| 3,255,899 | 6/1966 | Mengel | 414/303 |
| 3,369,498 | 2/1968 | O'Toole et al. | 104/44 |

Primary Examiner—Robert J. Spar
Assistant Examiner—David A. Bucci

[57] ABSTRACT

The invention provides a sturdy substantially rectangular scow-like turntable platform with retractable wheels for mobility and turntable mechanics for the use of heavy trucks. The turntable platform is towable and can be used with wheels down or with wheels retracted for bottom surface friction stabilization. A trailer is provided with powering devices and controls for operating the turntable motor and the various ram activated devices. The turntable motor and the rams can be powered by pressurized hydraulic fluid or by compressed air.

5 Claims, 2 Drawing Sheets

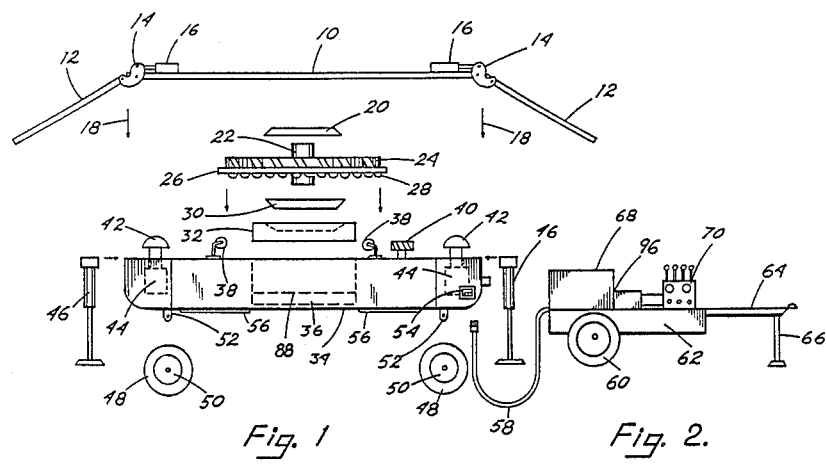
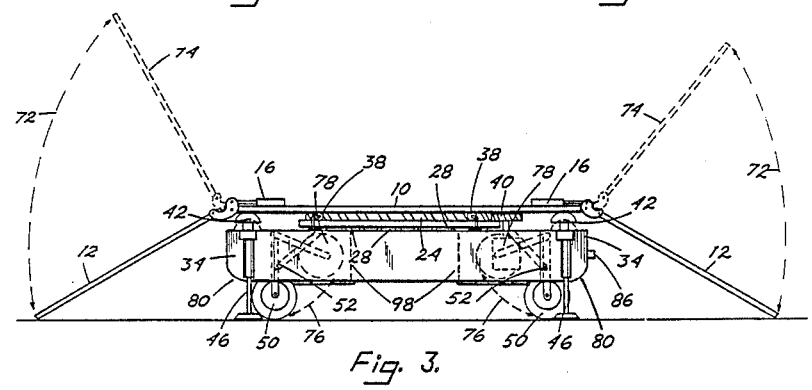
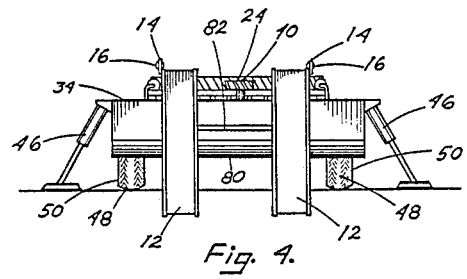

MOBILE TRUCK TURNTABLE

BACKGROUND OF THE INVENTION

1. Field of the Invention

This invention relates to heavy equipment turntables. The present invention is particularly directed towards a mobile truck turntable with hydraulic or air operation and control means.

2. Description of the Prior Art

Past art patents were examined from a search conducted in the following classes and subclasses:

104/44 and 410/1.

The patents which appeared to be most applicable to my invention included:

The Freshwater et al patent issued on Feb. 27, 1923, U.S. Pat. No. 1,446,498, depicts an improvement to turntables.

U.S. Pat. No. 1,449,767, dated Mar. 27, 1923, was issued to MacLean for a "Portable Turntable".

A patent issued to Miner on May 8, 1923, U.S. Pat. No. 1,454,482, shows another "Portable Turntable".

On Jan. 15, 1924, Topping was issued U.S. Pat. No. 1,480,872, which discloses a device for turning vehicles around on a fixed center.

The patent issued on Mar. 24, 1931, to Koehler, U.S. Pat. No. 1,797,830, shows a turntable designed to turn cars in areas of limited space.

The Axman patent dated Jan. 3, 1961, U.S. Pat. No. 2,967,045, depicts a turntable attachment for tractors A patent issued to Mengel on June 14, 1966, patent unloading and distributing material.

The Sorg patent, dated Oct 27, 1970, U.S. Pat. No. 3,536,214, was issued for "Turntable Trailer Apparatus".

On Sept. 2, 1986, Astill was issued U.S. Pat. No. 4,609,111 on a rotatable stand for displaying objects.

To the best of my knowledge, the afore listed patents disclose devices most nearly in the nature f my invention. However, my invention is considerably different in design, structure, and operational mechanics from the devices of the past-art patent disclosures.

SUMMARY OF THE INVENTION

Therefore, in practicing my invention, I have provided a sturdy substantially rectangular scow-like turntable platform with retractable wheels for mobility and turntable mechanics for the use of heavy trucks. The bottom of the turntable platform is half rounded upwardly at the shorter walls producing terminal ends. The longitudinal walls are vertically inclined and half rounded at lower ends for corresponding attachment to the half rounded end walls. A carrier ramp hingedly affixed at each end with drive up loading ramps is positioned uppermost on the top surface of the turntable platform. The carrier ramp is fitted to heavy duty turntable structure on top of and extending downwardly inside the turntable platform. The turntable platform is equipped with hydraulic or air means for turning the turntable in a complete circle, for raising and lowering the retractable mobility wheels, for stabilizing the carrier ramp, and for stabilizing the turntable platform in a bottom rest position on various terrain by support of affixed hydraulic or air outriggers. Motor power, controls, and pressurized oil for the hydraulic system or compressed air for air-activated systems is supplied from an accompanying trailer.

In consequence, a principal object of my invention is to provide a stable scow-like turntable platform which can be lowered to a positive ground position and has the necessary hydraulic or air mechanics for use as a turn-around terminal for heavy equipment, primarily dump trucks.

Another object of the invention is to provide a mobile heavy duty truck turnaround platform with retractable wheels and compressed air or hydraulically lifted loading ramps which can be lifted and the wheels lowered so the platform can be moved by towing from job site to job site.

A further object of my invention is to provide a turntable platform with a scow-like body having partly curved up terminal ends which allows the operators to retract the wheels and slide the turntable platform into various use positions at the job site by pushing the turntable platform with any available mover equipment.

Other objects and the many advantages of my invention will become clear from a reading of the specification and comparing numbered parts described with similarly numbered parts shown in the accompanying drawings.

BRIEF DESCRIPTION OF THE DRAWINGS

In the drawings:

FIG. 1 shows the mobile truck turntable in a partly exploded view to illustrate various parts of the structure.

FIG. 2 show the trailer with motor, the hydraulic fluid pressure tank, the operational controls, and numerically indicates position of optional air supply.

FIG. 3 is a side view drawing of the assembled turntable platform with dotted lines indicating loading ramps raised and retractable wheels retracted.

FIG. 4 shows the mobile truck turntable assembled structure in an end view ready for use with wheels down.

DRAWING REFERENCE NUMERALS

Figure 5:
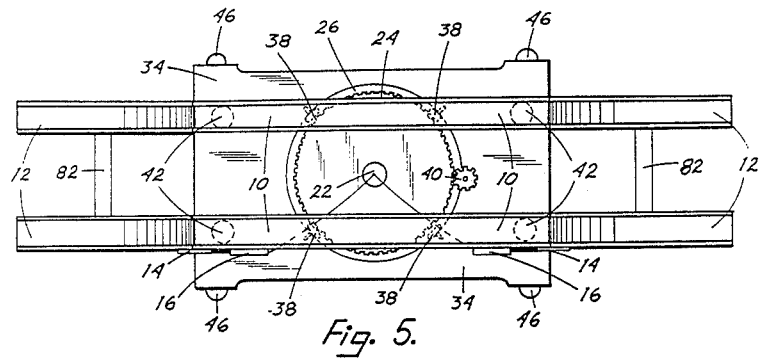
FIG. 5 is a top plan view of the mobile truck turntable.

10: carrier ramps
12: loading ramps
14: hinging centric arms
16: ramp lift air or hydraulic rams
18: direction of assembly arrows
20: upper gear shaft cap
22: turntable gear shaft
24: turntable gear
26: hook roller flange
28: turntable gear support rollers
30: bushing
32: bushing cage
34: turntable platform
36: bushing well
38: hook rollers
40: motored turntable driving gear
42: carrier ramp supports 44: carrier ramp support arms
46: air or hydraulic outriggers
48: heavy duty street tires
50: heavy duty wheels
52: wheel mounts and ram structures
54: hydraulic line junction box
56: skid plates
58: hydraulic lines
60: street tired trailer wheels
62: trailer bed
64: trailer hitch
66: hitch jack
68: gas or diesel powered pumping unit
70: gauge and control unit
72: ramp rise positions
74: ramp up positions
76: wheel retraction path
78: retracted wheel position
80: upwardly curved lower platform terminal ends
82: loading ramps cross support bar
84: truck
86: tow bar brackets
88: box H-beams
90: brass bushings
92: H-beam braces
94: load
96: pressurized air supply

DESCRIPTION OF THE PREFERRED EMBODIMENT

Referring now to the drawings at FIG. 1 where various parts of the mobile truck turntable are shown in position for assembly. Carrier ramps 10 attached at both ends to loading ramps 12 by hinging centric arms 14 can be seen in the uppermost position. Also attached, one to each end of one of carrier ramps 10 are ramp lift air or hydraulic rams 16 which are used to raise and lower loading ramps 12. Included in the FIG. 1 illustration are upper gear shaft cap 20, a protective gear covering; turntable gear shaft 22, the vertical turntable gear axle; turntable gear 24, vertical gear teeth for turning the turntable when mashed with the cooperative gear teeth of air 96 or hydraulically motored turntable driving gear 40; and turntable gear 24 abutted on top of turntable gear platform 34, a flat bottomed disc-like platform with hook rollers 38 pressing down on an upwardly exposed lip-like hook roller flange 26 to hold the flat bottom pressured equally on turntable gear support rollers 28, which allows level movement of the turntable with considerable weight resting on carrier ramps 10. Bushing 30 fits inside of bushing cage 32 and both are seated in turntable platform 34 in bushing well 36, indicated by dotted lines in FIG. 1. Carrier ramp supports 42 motivated for upward and downward movement by carrier ramp support rams 44 add additional support to the ends of carrier ramps 10 as needed. The listed parts shown individually in the illustration at FIG. 1 are assembled downwardly as indicated by direction of assembly arrows 18 and fit into turntable platform 34 as illustrated in FIG. 3. The accompanying trailer with a gasoline or diesel power pumping unit 68 in trailer bed 62 supplies pressurized hydraulic fluid or compressed air 96 as shown in FIG. 2. Trailer bed 62 is supported by street tired trailer wheels 60 and is balanced in a level position by trailer hitch 64 and hitch jack 66. Trailer hitch 64 is the hitch for towing the trailer. Although compressed air 96 may be substituted for hydraulic operation, the principal powering of the herein described embodiment is pressurized hydraulic fluid supplied by gas or diesel power pumping unit 68 charged with hydraulic fluid directed through gauge and control unit 70 and on through hydraulic lines 58 to hydraulic line junction box 54 in the wall of turntable platform 34. Hydraulic line junction box 54 has internal lines connections to the various hydraulic motors and rams for individual operational functions which are controlled at gauge and control unit 70 in trailer bed 62.

Figure 7:
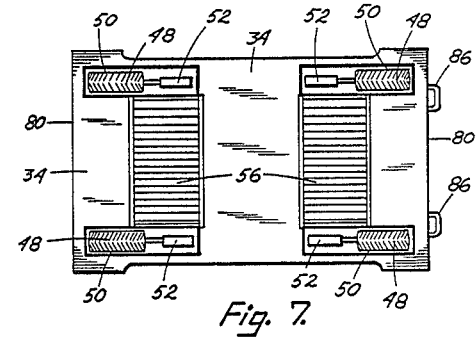
FIG. 7 shows the turntable platform in a view upwards of the bottom side disclosing the wheel wells and the skid plates.
Figure 8:
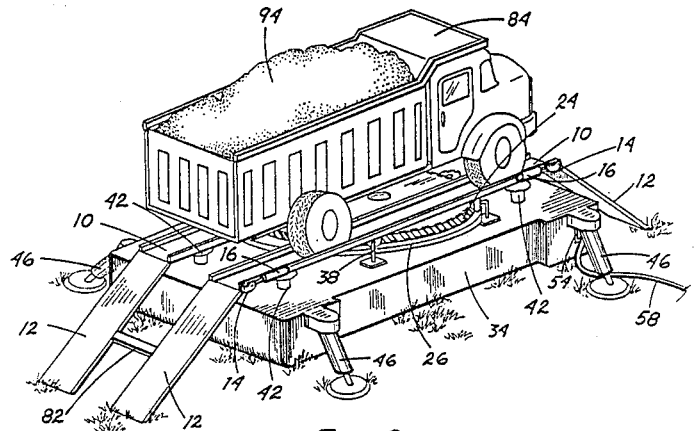
FIG. 8 is a perspective view of the mobile truck turntable in use with the wheels of a loaded truck positioned on the carrier ramp for turnaround.

Additional parts shown in FIG. 1 unassembled and assembled in FIG. 3 include hydraulic or air outriggers 46 which retain turntable platform 34 in a stable position with heavy duty wheels 50 resting on heavy duty street tires 48 as shown in FIG. 3 and FIG. 4 or with heavy duty wheels 50 retracted and turntable platform 34 resting on skid plates 56 in use as illustrated in FIG. 8. Upwardly curved lower platform terminal ends 80 forms turntable platform into a scow-like structure which can be pushed by tractor on skid plates 56 into desired operational positions. With heavy duty wheels 50 on heavy duty street tires 48 in the unretracted or down position, turntable platform 34 can be towed from job to job by connecting a Y-type tow bar to tow bar brackets 86. For towing or other movements, loading ramps 12 can be raised by ramp lift rams 16 along ramp rise positions 72 to the position of ramp up position 74 as illustrated in FIG. 3. The loading ramps 12 are supportively connected on both ends by load ramp cross support bar 82 which allows both loading ramps 12 to be lifted and lowered by one ramp lift ram 16 for each pair of loading ramps 12. The wheel wells 98 and the retractive wheel mechanics of wheel mounts and ram structures 52 can be seen in FIG. 1, FIG. 3, and in a wheels down bottom view in FIG. 7. Heavy duty wheels 50 can be raised along wheel retraction path 76 to retracted wheel position 78 shown best in FIG. 3. Wheel mounts and ram structures 52 allow sufficient limited swiveling of heavy duty wheels 50 for street towing when heavy duty wheels are fully extended downwardly at the tow bar bracket 86 end of turntable platform 34.

Figure 6:
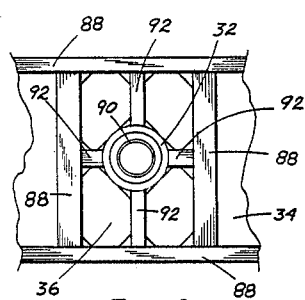
FIG. 6 shows a top plan sectional view of the H-beam, the bracing structure, and the mounted bushing supporting the turntable gear shaft in the bushing cage.

The various parts in operational position are best seen in the top plan view drawings at FIG. 5. In FIG. 6, supporting structure box H-beams 88 are shown in a top plan sectional view with H-beam braces 92 on the sides and brass bushing 90 centrally positioned by bushing cage 32 in bushing well 36. Brass bushing 90 is the bottom resting supporting member for turntable gear shaft 22.

In use, the mobile truck turntable of the present invention can be towed to a job side with heavy duty wheels 50 down and riding on heavy duty street tires 48. Heavy duty wheels 50 can swivel sufficiently at the towing end of turntable platform 34 for street towing. On job sites, turntable platform 34 might have to be moved backward or forward on the wheels or with the wheels retracted slid to the use position by pushing with a tractor. Lowering turntable platform 34 to rest on the ground by retracting heavy duty wheels 50 and then dirt ramping under the ends of loading ramps 12 makes driving truck 84 with load 94 up loading ramps 12 onto carrier ramps 10 easier. The principal use of this mobile truck turntable is for redirecting a loaded truck in a confined environment.

Although I have described the preferred embodiment of my invention with considerable details in the specification, it is to be understood that modifications in the design and structure of the device may be practiced so long as those modifications remain within the intended scope of the appended claims.

What is claimed is:

1. A mobile truck turntable comprising a substantially rectangular, scow-like turntable platform affixed upwardly on a top surface with carrier ramps and having drive-up loading ramps hingedly attached at both ends thereof; said turntable platform provided with mechanical means for redirecting a vehicle positioned on said carrier ramps; said turntable platform having vertical side walls and a bottom surface curved upwardly at two short walled terminal ends producing a slidable scow-like structure; said bottom surface affixed with slide plates and at least four retractable wheels positioned in wells in said bottom surface; there being mechanical means included therein for raising and lowering said wheels; there being street tires on said wheels; the arrangement of said retractable wheels with said street tires providing towable mobility for said turntable platform with two of said wheels adjacent two tow bar brackets affixed in the vertical surface of one said terminal end; said slidable scow-like structure being for sliding said turntable platform to use position with wheels retracted; there being mechanical means for raising and lowering said loading ramps; there being mechanically adjustable supports for said carrier ramps and ram activated stabilizers adjustably fitted at four corners of said turntable platform; said turntable platform having interconnected hydraulic lines as required for operating said rams turntable mechanical means; said interconnected hydraulic lines terminating at a hydraulic line junction box in a vertical side wall of said turntable platform with pressurized hydraulic fluid supplied through said junction box by hydraulic lines removably connected thereto; said hydraulic lines supplying pressurized hydraulic fluid from a trailer equipped with controls, gauges, pressure tank, pump and a gasoline or diesel engine as a power supply.

2. The mobile truck turntable of claim 1 wherein said mechanical means and said rams are air driven, said pressurized hydraulic fluid is replaced by air, said hydraulic lines are replaced by air lines, said hydraulic line junction box is replaced by an air line junction box, said controls, gauges, pressure tank, and said pump are replaced with air pressure oriented equipment.

3. The mobile truck turntable of claim 1 wherein said mechanical means for redirecting a vehicle is a flattened, circular, gear teeth edged disc affixed to and under said top carrier ramps and abutted on the top of a disc platform with supporting rollers thereunder and said disc platform lipping said gear teeth with retaining hook rollers pressing downwardly thereon; said gear teeth edged disc and said disc platform affixed centrally to a vertically inclined axle gear shaft retained in and supported by bearings in said turntable platform, there being a motored turntable driving gear cooperatively meshed with said disc gear teeth operational by said trailer equipped controls and said pressurized hydraulic fluid.

4. The mobile truck turntable of claim 1 wherein said mechanical means for raising and lowering said loading ramps is a ram affixed one at each end of one of said carrier ramps to a hinging centric arm arranged to raise and lower one loading ramp at each end of said one carrier ramp with a second loading ramp hingedly affixed adjacently raised and lowered simultaneously by a cross arm support affixing said loading ramps in attached pairs.

5. The mobile truck turntable of claim 1 wherein said mechanically adjustable supports for said carrier ramp fitted at four corners of said turntable platform are vertically inclined rams with rods upwardly fitted by concave caps positioned to support the ends of said top carrier ramps when required with said rams controlled at said trailer and operational by said pressurized hydraulic fluid.

* * * * *